United States Patent
Duan et al.

(10) Patent No.: US 11,465,242 B2
(45) Date of Patent: Oct. 11, 2022

(54) ON-LINE QUANTITATIVE EVALUATION METHOD FOR STABILITY OF WELDING PROCESS

(71) Applicant: SHANDONG UNIVERSITY, Shandong (CN)

(72) Inventors: Bin Duan, Jinan (CN); Chenghui Zhang, Jinan (CN); Yanzhao Ren, Jinan (CN); Qi Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 484 days.

(21) Appl. No.: 16/627,587

(22) PCT Filed: Nov. 1, 2017

(86) PCT No.: PCT/CN2017/108918
§ 371 (c)(1),
(2) Date: Dec. 30, 2019

(87) PCT Pub. No.: WO2019/000760
PCT Pub. Date: Jan. 3, 2019

(65) Prior Publication Data
US 2020/0130108 A1 Apr. 30, 2020

(30) Foreign Application Priority Data
Jun. 29, 2017 (CN) .......................... 201710514801.3

(51) Int. Cl.
*B23K 31/12* (2006.01)
(52) U.S. Cl.
CPC ................................. *B23K 31/125* (2013.01)

(58) Field of Classification Search
CPC ................................................. B23K 31/125
See application file for complete search history.

(56) References Cited

U.S. PATENT DOCUMENTS 6,660,965 B2 12/2003 Simpson
2003/0094478 A1 5/2003 Simpson

FOREIGN PATENT DOCUMENTS

| CN | 1411401 A | 4/2003 |
| CN | 102430835 A | 5/2012 |

(Continued)

OTHER PUBLICATIONS

Mar. 19, 2018 Search Report issued in International Patent Application No. PCT/CN2017/108918.

(Continued)

*Primary Examiner* — Stephen P Avila
(74) *Attorney, Agent, or Firm* — Oliff PLC

(57) ABSTRACT

An on-line quantitative evaluation method for the stability of a welding process includes the steps of monitoring and acquiring the arc voltage U and the welding current I during the welding process, and drawing a phase diagram of each U-I cycle; converting the phase diagram of each U-I cycle into a binary image K; obtaining an area $J_N$ through which a dynamic working curve passes in the binary image K; obtaining a welding process stability evaluation index P according to the formula (1), where $J_N$ is the area of a U-I curve, N is the number of cycles passed, L is the total number of samples in N cycles, and P is the repetition rate of the i-th U-I cycle and other cycles (i=1 . . . N); and evaluating the stability of the welding process according to the obtained welding stability evaluation index P.

13 Claims, 1 Drawing Sheet

(a)

(b)

(56) References Cited

FOREIGN PATENT DOCUMENTS

| | | | | | |
|---|---|---|---|---|---|
| CN | 102749495 | A | | 10/2012 | |
| CN | 102764927 | A | | 11/2012 | |
| CN | 102922089 | A | | 2/2013 | |
| CN | 103357987 | A | | 10/2013 | |
| CN | 103551709 | B | * | 4/2015 | ........... B23K 31/125 |
| CN | 104625332 | A | | 5/2015 | |
| CN | 106862716 | A | | 6/2017 | |
| CN | 107081533 | A | | 8/2017 | |
| JP | S62-134191 | A | | 6/1987 | |
| JP | 3697359 | B2 | | 9/2005 | |
| WO | WO-0143910 | A1 | * | 6/2001 | ............. B23K 10/02 |

OTHER PUBLICATIONS

Mar. 19, 2018 Written Opinion issued in International Patent Application No. PCT/CN2017/108918.

* cited by examiner

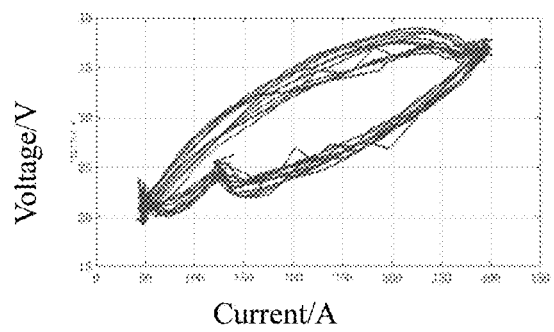 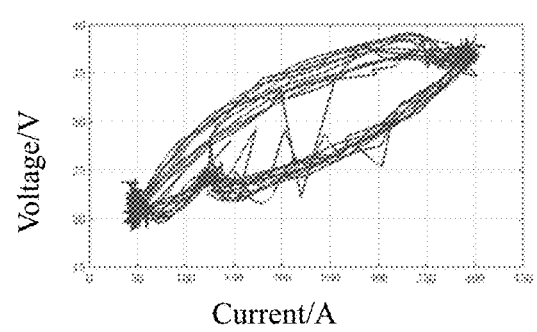
(a)  (b)

ON-LINE QUANTITATIVE EVALUATION METHOD FOR STABILITY OF WELDING PROCESS

FIELD OF THE INVENTION

The present invention belongs to the field of on-line quantitative evaluation on the stability of welding processes, and specifically relates to an on-line quantitative evaluation method for the stability of a welding process.

BACKGROUND OF THE INVENTION

Welding is the most common metal connecting method, and many large projects such as the West-East Gas Pipeline and the Bird's Nest are welded out. When dozens or even hundreds of welding power sources work at the same time, a group control system is often required to monitor the welding process in real time and analyze the data to ensure the welding quality, in which, the analysis on the stability of the welding process is one of the important indicators for evaluating the welding quality.

The voltage U and the current I are the two most important external characteristic parameters of a welding power source. A U-I phase diagram constituted characterizes a correlation between the arc voltage and the welding current, and describes dynamic trajectories of U-I working points during the welding process. For example, in a pulse welding process, a U-I phase diagram curve is distributed in a "□" shape (shape of the mouth) on a working tape, one "□" character is formed after each pulse cycle, and the "□" characters are superimposed to form a U-I phase diagram. Through the repeatability of the trajectories of the U-I working points, the stability of the welding process can be intuitively determined, that is, if the trajectories of the U-I working points are more concentrated, the consistency and stability of the welding process are higher, otherwise, the welding quality is worse. Therefore, how to change human determination to automatic identification on the U-I phase diagram has become a key technology to determinate the stability of the welding process.

SUMMARY

In order to overcome the above shortcomings, the present invention proposes a quantitative evaluation on the stability of a welding process based on a U-I binary image, which has the advantages of simplicity, fastness and the like, and can be conveniently implemented in group control system software. The quantitative evaluation can be used to determinate the stability and consistency of the welding process, and quantitative determination can be implemented just by calling a MATLAB command in software.

In order to achieve the above objectives, the present invention adopts the following technical solution:

An on-line quantitative evaluation method for the stability of a welding process, including: monitoring and acquiring the arc voltage U and the welding current I during the welding process, and drawing a phase diagram of each U-I cycle;
  converting the phase diagram of each U-I cycle into a binary image K;
  obtaining an area $J_N$ through which a dynamic working curve passes in the binary image K;
  obtaining a welding process stability evaluation index P according to formulas (1) and (2);

$$J_N = \frac{L(1-(1-P)^N)}{NP}; \tag{1}$$

$$\frac{Q}{M} = \frac{J_N}{\text{total area of } UI \text{ phase diagram}}; \tag{2}$$

where $J_N$ is the area of a U-I curve, N is the number of cycles passed, L is the total number of samples in N cycles, P is the repetition rate of the i-th U-I cycle and other cycles (i=1 . . . N), Q is the sum of non-background areas obtained by using a command sum (L(:)) after L is inverted in a binary image matrix L=bwlabel(K), and M is the number of elements in the binary image matrix L=bwlabel(K);
  and evaluating the stability of the welding process according to the obtained welding stability evaluation index P.

Preferably, the specific step of acquiring is: obtaining a corresponding phase diagram of each U-I cycle according to the values of the arc voltage U and the welding current I acquired by a group control system in real time.

Preferably, the specific step of converting the phase diagram of the U-I cycle into the binary image K is: saving the U-I phase diagram as "UI.jpg", importing the image into MATLAB by using a command I=imread('UI.jpg'), and converting the U-I phase diagram file into the binary image K through a binary conversion function im2bw( ).

More preferably, in the binary image K, the gray value is 0 in the place where the U-I dynamic working trajectory passes, and otherwise is 1.

Preferably, the specific step of obtaining an area $J_N$ through which a dynamic working curve passes is: inverting L by making the binary image matrix L=bwlabel(K) (that is, the binary images K represented by 0 and 1), the number of "1"s in the image matrix being the total number of points or area through which the UI curve passes;

The sum Q of non-background areas is obtained by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phase diagram}}.$$

More preferably, the number of elements in the binary image matrix L=bwlabel(K) is M.

The present invention also provides an application of any of the above methods in $CO_2$ gas shielded welding, MAG/MIG welding, and occasions where the output characteristics are double variables and high consistency.

The present invention also provides an on-line quantitative evaluation apparatus for the stability of a welding process, including:
  a detection apparatus, configured to monitor the arc voltage U and the welding current I during the welding process and acquire various detection data;
  an input device, configured to transmit the various detection data to a processor;
  the processor, configured to process the various detection data to obtain a welding process stability evaluation index P;
  an output device, configured to output the welding process stability evaluation index P obtained by the processor; and a display, configured to display the result output by the output device.

Preferably, the specific steps of processing the various detection data are:

1) drawing a corresponding phase diagram of a U-I cycle according to the values of the arc voltage U and the welding current I of each cycle during the welding process;

2) converting a phase diagram of each U-I cycle into a binary image K;

3) obtaining an area $J_N$ through which a dynamic working curve passes in the binary image K; and 4) obtaining a welding process stability evaluation index P according to formulas (1) and (2);

$$J_N = \frac{L(1-(1-P)^N)}{NP}; \quad (1)$$

$$\frac{Q}{M} = \frac{J_N}{\text{total area of } UI \text{ phase diagram}}; \quad (2)$$

where $J_N$ is the area of a UI curve, N is the number of cycles passed, L is the total number of samples in N cycles, P is the repetition rate of the i-th U-I cycle and other cycles (i=1 . . . N), Q is the sum of non-background areas obtained by using a command sum (L(:)) after L is inverted in a binary image matrix L=bwlabel(K), and M is the number of elements in the binary image matrix L=bwlabel(K).

More preferably, the specific step of converting the phase diagram of each U-I cycle into the binary image K is: saving the U-I phase diagram as "UI.jpg", importing the image into MATLAB by using a command I=imread('UI.jpg'), and converting the U-I phase diagram file into the binary image K through a binary conversion function im2bw( );

in the binary image K, the gray value is 0 in the place where the U-I dynamic working trajectory passes, and otherwise is 1;

the number of elements in the binary image matrix L=bwlabel(K) is M;

the specific step of obtaining an area $J_N$ through which a dynamic working curve passes is: inverting L by making the binary image matrix L=bwlabel(K), at this time the number of "1"s in the image matrix being the total number of points or area through which the UI curve passes;

the sum Q of non-background areas is obtained by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phase diagram}}.$$

BENEFICIAL EFFECTS OF THE INVENTION (1) This method can be used to determinate the stability and consistency of a welding process, and can quickly achieve quantitative determination just by calling a MATLAB command in software.

(2) This method can implement quick on-line evaluation on the welding process, has the advantage of low hysteresis as compared with the conventional defect detection method, and achieves rapid closed-loop control of welding quality.

(3) This method can be applied to $CO_2$ gas shielded welding, MAG/MIG welding, etc. and where the output characteristics are double variables and high consistency, and has a broad application prospect.

(4) The evaluation method of the present invention is simple, practical and easy to popularize.

BRIEF DESCRIPTION OF THE DRAWING

The drawing accompanying the Description and constituting a part of the present application is used for providing a further understanding of the present application, and the schematic embodiments of the present application and the descriptions thereof are used for interpreting the present application, rather than constituting improper limitations to the present application.

FIG. 1 shows a U-I phase diagram of a welding process, where the parts (a), (b) are U-I phase diagrams of different welding processes.

DETAILED DESCRIPTION OF EMBODIMENTS

It should be pointed out that the following detailed descriptions are all exemplary and aim to further illustrate the present application. Unless otherwise specified, all technological and scientific terms used herein have the same meanings generally understood by those of ordinary skill in the art of the present application.

Embodiment 1

A U-I phase diagram of a welding process is shown in FIG. 1. A welding process stability evaluation index P is defined, which represents an average repetition rate of a U-I cycle and other cycles. When P=100%, it indicates that the changes in each cycle and previous cycles are completely consistent, and such welding process is absolutely stable. On the contrary, the smaller P is, the more irregular the changes in the arc voltage and the welding current of the welding process are, and the poorer the consistency of welding quality is.

It is assumed that, after the first U-I cycle the number of points on the phase diagram is:

$$J_1 = \alpha$$

After the second cycle, the first cycle and the second cycle have Pα points repeated. At this time, the number of points on the U-I phase diagram increases by (1−P)α points, and the total number of points is:

$$J_2 = \alpha + \alpha - P\alpha = \alpha + (1-P)\alpha$$

After the third cycle, the number of points increasing on the U-I phase diagram is (1−P)α−P(1−P)α, and at this time the total number of points is:

$$J_3 = \alpha + (1-P)\alpha + (1-P)\alpha - P(1-P)\alpha = \alpha + (1-P)\alpha + (1-P)^2\alpha$$

After the N-th cycle, α may be replaced with the number of points evaluated per cycle $$\frac{L}{N},$$

where L is the total number of samples over a period of time, and the following can be obtained by mathematical induction:

$$J_N = \frac{L(1-(1-P)^N)}{NP}$$

In the formula, only $J_N$ and P are unknown, and the average repetition rate P can be obtained just by obtaining $J_N$. Practically, $J_N$ represents an area through which the U-I curve passes. In the present invention, the area of the curve in the U-I phase diagram is obtained by using an image binarization method. The specific steps are as follows:

(1) A U-I phase diagram is obtained according to the values of the arc voltage U and the welding current I obtained by a group control system in real time, and saved as "UI.jpg", and the image is imported into MATLAB by using a command I=imread('UI.jpg').

(2) The U-I phase diagram file is converted into a binary image K through a binary conversion function im2bw( ). At this time, the U-I phase diagram may show a black and white effect: the gray value is 0 in the place where the UI dynamic working trajectory passes, and otherwise is 1.

(3) The obtained binary image matrix L=bwlabel(K), and the number of elements thereof is M To facilitate the calculation, L is inverted, so that the number of "1" in the image matrix is the total number of points or area that the U-I curve passes through.

(4) The sum Q of non-background areas is obtained by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phrase diagram}}.$$

(5) The repetition rate P can be obtained according to the previous formula $$J_N = \frac{L(1-(1-P)^N)}{NP}.$$

The stability of the system can be determinated based on P.

By the calculation above, the repetition rate $P_1$ in part (a) of FIG. 1 is 0.0701, and the repetition rate $P_2$ in part (b) of FIG. 1 is 0.0305. $P_1$ greater than $P_2$ indicates that the welding process shown in part (a) of FIG. 1 has good stability and high welding consistency, which achieves the same effect as human intuitive determination.

Embodiment 2

The evaluation of the stability of a $CO_2$ gas shielded welding process. A welding process stability evaluation index P is defined, which represents an average repetition rate of a U-I cycle and other cycles. When P=100%, it indicates that the changes in each cycle and previous cycles are completely consistent, and the welding process is absolutely stable. On the contrary, the smaller P is, the more irregular the changes in the arc voltage and the welding current of the welding process are, and the poorer the consistency of welding quality is.

It is assumed that, after the first U-I cycle the number of points on the phase diagram is:

$$J_1 = \alpha$$

After the second cycle, there are $P\alpha$ points repeated between the first cycle and the second cycle. At this time, the number of points on the U-I phase diagram increases by $(1-P)\alpha$ points, and the total number of points is:

$$J_2 = \alpha + \alpha - P\alpha = \alpha + (1-P)\alpha$$

After the third cycle, the number of points increasing on the U-I phase diagram is $(1-P)\alpha - P(1-P)\alpha$, and at this time the total number of points is:

$$J_3 = \alpha + (1-P)\alpha + (1-P)\alpha - P(1-P)\alpha = \alpha + (1-P)\alpha + (1-P)^2\alpha$$

After the N-th cycle, $\alpha$ may be replaced with the number of points evaluated per cycle $$\frac{L}{N},$$

where L is the total number of samples over a period of time, and the following can be obtained by mathematical induction:

$$J_N = \frac{L(1-(1-P)^N)}{NP}$$

In the formula, only $J_N$ and P are unknown, and the average repetition rate P can be obtained just by obtaining $J_N$. Practically, $J_N$ represents an area through which the U-I curve passes. In the present invention, the area of the curve in the U-I phase diagram is obtained by using an image binarization method. The specific steps are as follows:

(1) A U-I phase diagram is obtained according to the values of the arc voltage U and the welding current I obtained by a group control system in real time, and saved as "UI.jpg", and the image is imported into MATLAB by using a command I=imread('UI.jpg').

(2) The U-I phase diagram file is converted into a binary image K through a binary conversion function im2bw( ). At this time, the U-I phase diagram may shows a black and white effect: the gray value is 0 in the place where the UI dynamic working trajectory passes, and otherwise is 1.

(3) The obtained binary image matrix L=bwlabel(K), and the number of elements thereof is M. To facilitate the calculation, L is inverted, so that the number of "1"s in the image matrix is the total number of points or area that the U-I curve passes through.

(4) The sum Q of non-background areas is obtained by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phrase diagram}}.$$

(5) The repetition rate P can be obtained according to the previous formula $$J_N = \frac{L(1-(1-P)^N)}{NP}.$$

The stability of the system can be determinated based on the P.

By the calculation above, the same U-I welding process having large repetition rate P has good stability and high welding consistency, which achieves the same effect as human intuitive determination.

Embodiment 3

The evaluation of the stability of an MAG/MIG welding process. A welding process stability evaluation index P is defined, which represents an average repetition rate of a U-I cycle and other cycles. When P=100%, it indicates that the changes in each cycle and previous cycles are completely consistent, and the welding process is absolutely stable. On the contrary, the smaller P is, the more irregular the changes in the arc voltage and the welding current of the welding process are, and the poorer the consistency of welding quality is.

It is assumed that after the first U-I cycle the number of points on the phase diagram is:

$$J_1 = \alpha$$

After the second cycle, there are P$\alpha$ points repeated between the first cycle and the second cycle. At this time, the number of points on the U-I phase diagram increases by $(1-P)\alpha$ points, and the total number of points is:

$$J_2 = \alpha + \alpha - P\alpha = \alpha + (1-P)\alpha$$

After the third cycle, the number of points increasing on the U-I phase diagram is $(1-P)\alpha - P(1-P)\alpha$, and at this time the total number of points is:

$$J_3 = \alpha + (1-P)\alpha + (1-P)\alpha - P(1-P)\alpha = \alpha + (1-P)\alpha + (1-P)^2\alpha$$

After the N-th cycle, $\alpha$ may be replaced with the number of points evaluated per cycle $$\frac{L}{N},$$

where L is the total number of samples over a period of time, and the following can be obtained by mathematical induction:

$$J_N = \frac{L(1-(1-P)^N)}{NP}$$

In the formula, only $J_N$ and P are unknown, and the average repetition rate P can be obtained just by obtaining $J_N$. Practically, $J_N$ represents an area through which the U-I curve passes. In the present invention, the area of the curve in the U-I phase diagram is obtained by using an image binarization method. The specific steps are as follows:

(1) A U-I phase diagram is obtained according to the values of the arc voltage U and the welding current I obtained by a group control system in real time, and saved as "UI.jpg", and the image is imported into MATLAB by using a command I=imread('UI.jpg').

(2) The U-I phase diagram file is converted into a binary image K through a binary conversion function im2bw( ). At this time, the U-I phase diagram may show a black and white effect: the gray value is 0 in the place where the UI dynamic working trajectory passes, and otherwise is 1.

(3) The obtained binary image matrix L=bwlabel(K), and the number of elements thereof is M. To facilitate the calculation, L is inverted, so that the number of "1" in the image matrix is the total number of points or area that the U-I curve passes through.

(4) The sum Q of non-background areas is obtained by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phrase diagram}}.$$

(5) The repetition rate P can be obtained according to the previous formula $$J_N = \frac{L(1-(1-P)^N)}{NP}.$$

The stability of the system can be determinated based on the P.

By the calculation above, the welding process having large repetition rate P has good stability and high welding consistency, which achieves the same effect as human intuitive determination.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

The invention claimed is:
1. An on-line quantitative evaluation method for the stability of a welding process, comprising:
monitoring and acquiring the arc voltage U and the welding current I during the welding process, and drawing a corresponding phase diagram of a U-I cycle;
converting the phase diagram of each U-I cycle into a binary image K;
obtaining an area $J_N$ through which a dynamic working curve passes in the binary image K;
obtaining a welding process stability evaluation index P according to formulas (1) and (2);

$$J_N = \frac{L(1-(1-P)^N)}{NP}; \tag{1}$$

$$\frac{Q}{M} = \frac{J_N}{\text{total area of } UI \text{ phrase diagram}}; \tag{2}$$

where $J_N$ is the area of a U-I curve, N is the number of cycles passed, L is the total number of samples in N cycles, P is the repetition rate of the i-th U-I cycle and other cycles (i=1 . . . N), Q is the sum of non-background areas obtained by using a command sum (L(:)) after L is inverted in a binary image matrix L=bwlabel(K), and M is the number of elements in the binary image matrix L=bwlabel(K);
and evaluating the stability of the welding process according to the obtained welding stability evaluation index P.

2. The method according to claim 1, wherein the specific step of acquiring is: obtaining a corresponding phase diagram of each U-I cycle according to the values of the arc voltage U and the welding current I acquired by a group control system in real time.

3. The method according to claim 1, wherein the specific step of converting the phase diagram of the U-I cycle into the binary image K is: saving the U-I phase diagram as "UI.jpg", importing the image into MATLAB by using a command I=imread('UI.jpg'), and converting the U-I phase diagram file into the binary image K through a binary conversion function im2bw( ).

4. The method according to claim 3, wherein in the binary image K, the gray value is 0 in the place where the U-I dynamic working trajectory passes, and otherwise is 1.

5. The method according to claim 1, wherein the specific steps of obtaining an area $J_N$ through which a dynamic working curve passes are: inverting L by making the binary image matrix L=bwlabel(K), at this time the number of "1" in the image matrix being the total number of points or area through which the UI curve passes;

obtaining the sum Q of non-background areas by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phrase diagram}}.$$

6. An application of the method according to claim 1 in $CO_2$ gas shielded welding, MAG/MIG welding, and occasions where the output characteristics are double variables and high consistency.

7. An on-line quantitative evaluation apparatus for the stability of a welding process, comprising:
a detection apparatus, configured to monitor the arc voltage U and the welding current I during the welding process and acquire various detection data;
an input device, configured to transmit the various detection data to a processor;
the processor, configured to process the various detection data to obtain a welding process stability evaluation index P;
an output device, configured to output the welding process stability evaluation index P obtained by the processor; and
a display, configured to display the result output by the output device, wherein the specific steps of processing the various detection data are:
1) drawing a corresponding phase diagram of a U-I cycle according to the values of the arc voltage U and the welding current I of each cycle during the welding process;
2) converting a phase diagram of each U-I cycle into a binary image K;
3) obtaining an area $J_N$ through which a dynamic working curve passes in the binary image K; and
4) obtaining a welding process stability evaluation index P according to formulas (1) and (2);

$$J_N = \frac{L(1-(1-P)^N)}{NP}; \quad (1)$$

$$\frac{Q}{M} = \frac{J_N}{\text{total area of } UI \text{ phrase diagram}}; \quad (2)$$

where $J_N$ is the area of a U-I curve, N is the number of cycles passed, L is the total number of samples in N cycles, P is the repetition rate of the i-th U-I cycle and other cycles (i=1 . . . N), Q is the sum of non-background areas obtained by using a command sum (L(:)) after L is inverted in a binary image matrix L=bwlabel(K), and M is the number of elements in the binary image matrix L=bwlabel(K).

8. The apparatus according to claim 7, wherein the specific step of converting the phase diagram of the U-I cycle into the binary image K is: saving the U-I phase diagram as "UI.jpg", importing the image into MATLAB by using a command I=imread('UI.jpg'), and converting the U-I phase diagram file into the binary image K through a binary conversion function im2bw( );
in the binary image K, the gray value is 0 in the place where the U-I dynamic working trajectory passes, and otherwise is 1.

9. The apparatus according to claim 7, wherein the specific steps of obtaining an area $J_N$ through which a dynamic working curve passes are: inverting L by making the binary image matrix L=bwlabel(K), at this time the number of "1"s in the image matrix being the total number of points or area through which the U-I curve passes;

obtaining the sum Q of non-background areas by using a command sum (L(:)), the area of unit voltage and current in the U-I phase diagram is assumed to be 1, and the area $J_N$ through which the dynamic working curve passes in the U-I phase diagram can be obtained from $$\frac{Q}{M} = \frac{J_N}{\text{total area of } UI \text{ phrase diagram}}.$$

10. An application of the method according to claim 2 in $CO_2$ gas shielded welding, MAG/MIG welding, and occasions where the output characteristics are double variables and high consistency.

11. An application of the method according to claim 3 in $CO_2$ gas shielded welding, MAG/MIG welding, and occasions where the output characteristics are double variables and high consistency.

12. An application of the method according to claim 4 in $CO_2$ gas shielded welding, MAG/MIG welding, and occasions where the output characteristics are double variables and high consistency.

13. An application of the method according to claim 5 in $CO_2$ gas shielded welding, MAG/MIG welding, and occasions where the output characteristics are double variables and high consistency.

* * * * *